United States Patent
Huang et al.

(10) Patent No.: US 9,621,837 B1
(45) Date of Patent: Apr. 11, 2017

(54) METHODS AND DEVICES FOR SWITCHING BETWEEN DIFFERENT TV PROGRAM ACCOMPANYING SOUNDS

(71) Applicants: Hisense USA Corp., Suwanee, GA (US); Hisense Electric Co.,Ltd, Qingdao, Shandong (CN); Hisense International Co., Ltd., Qingdao, Shandong (CN)

(72) Inventors: Jinlong Huang, Suwanee, GA (US); Jianchun Zhang, Suwanee, GA (US)

(73) Assignees: Hisense USA Corp., Suwanee, GA (US); Hisense Electric Co., Ltd., Qingdao, Shandong (CN); Hisense International Co., Ltd., Qingdao, Shandong (CN)

( * ) Notice: Subject to any disclaimer, the term of this patent is extended or adjusted under 35 U.S.C. 154(b) by 0 days.

(21) Appl. No.: 14/922,635

(22) Filed: Oct. 26, 2015

(51) Int. Cl.
| | |
|---|---|
| *H04N 5/445* | (2011.01) |
| *H04N 5/44* | (2011.01) |
| *H04N 5/60* | (2006.01) |
| *H04N 21/422* | (2011.01) |
| *H04N 21/439* | (2011.01) |
| *H04N 21/81* | (2011.01) |

(52) U.S. Cl.
CPC .......... *H04N 5/607* (2013.01); *H04N 5/4403* (2013.01); *H04N 5/44543* (2013.01); *H04N 5/44582* (2013.01); *H04N 5/44591* (2013.01); *H04N 21/4221* (2013.01); *H04N 21/439* (2013.01); *H04N 21/8106* (2013.01); *H04N 2005/4412* (2013.01)

(58) Field of Classification Search
CPC .. H04N 5/44513; H04N 5/44543; H04N 5/45; H04N 5/4403; H04N 5/44582; H04N 5/44591; H04N 5/60; H04N 5/607
USPC ..... 348/725, 734, 738, 569, 570; 725/37, 60
IPC .................. H04N 5/44,5/60, 5/445, 5/45, 5/50
See application file for complete search history.

(56) References Cited

U.S. PATENT DOCUMENTS

| | | | |
|---|---|---|---|
| 6,266,098 B1* | 7/2001 | Cove | H04N 5/44513 348/563 |
| 8,314,887 B2* | 11/2012 | Wakisaka | H04N 21/485 348/563 |
| 2003/0227576 A1 | 12/2003 | Tsubouchi | |
| 2010/0053466 A1* | 3/2010 | Naka | H04N 5/4403 348/734 |

(Continued)

FOREIGN PATENT DOCUMENTS

EP    0 340 643 A2    11/1989

OTHER PUBLICATIONS

International Search Report and Written Opinion to PCT Application No. PCT/US2016/058675, dated Jan. 5, 2017, (11p).

*Primary Examiner* — Sherrie Hsia
(74) *Attorney, Agent, or Firm* — Brinks Gilson & Lione (57) ABSTRACT

The present disclosure relates to TV devices that implement methods for switching an accompanying sound of a TV program. According to the method, the TV device may display a current TV program under a first operation state of a plurality operation state associated with the current TV program; when receiving a first controlling signal, display a target menu on the screen, wherein the target menu includes a target menu option of operation which is a default option and is associated with the plurality of operation states of the current TV program; and when receiving a second controlling signal, directly switch the TV device to a second operation state along a sequence of the plurality of operation states.

20 Claims, 6 Drawing Sheets

(56) References Cited

U.S. PATENT DOCUMENTS

2010/0235745 A1    9/2010  Shintani

* cited by examiner

METHODS AND DEVICES FOR SWITCHING BETWEEN DIFFERENT TV PROGRAM ACCOMPANYING SOUNDS

BACKGROUND

Currently many television (TV) programs provide services for accompanying sound. An accompanying sound for a TV program is a sound service provided in addition to a normal sound of the TV program. For example, for an analog TV program, the accompanying sound may include different sound settings, such as monophonic, stereo sound, and/or second audio program (SAP). SAP is an auxiliary audio channel for analog television that can be broadcast or transmitted both over-the-air and by cable television. SAP is often used to provide audio tracks in languages other than the native language included in the program. For a digital TV program, the accompanying sound may include multichannel television sound (MTS). MTS is a method of encoding three additional channels of audio into an NTSC-format audio carrier. The additional channels may carry different language from the default language of the TV program.

Sometimes accompanying sound services are provided in a TV program to provide language options to viewers speaking different languages than the default language of the TV programs, or to help visually handicapped people understand the TV programs. To facilitate choosing the right accompanying sound, some remote controllers include special keys with an identification mark thereon, such as "MTS/SAP" or "Audio." A viewer may choose his/her desired accompanying sound (e.g., mono, stereo or SAP) or language (e.g., English or French etc.) by pressing these hot keys on a handheld remote controller. When the remote controller is a general remote controller, however, selecting the right accompanying sound is not as easy. Generally starting from a main menu of operation options, the user has to press keys on the controller to go through a few levels of menus or interfaces before reach the right menu for accompanying sound. The user then generally needs to press the "OK" key on the remote controller to confirm the change from the default sound to another accompanying sound. If the user does not correctly select the desired sound or wish to change to another accompanying sound, he/she will have to go through the selection procedure again. The above operations on general remote controllers are especially difficult for visually handicapped persons, who have hard time to read the menu options on the TV screen and correctly select several levels of the option menus down and reach the accompany sound option.

SUMMARY

Devices and methods in the present disclosure provide a solution to the above traditional difficulties and improved the accompanying sound selection technology.

According to an aspect of the present disclosure, a TV device may comprise a sensor configured to detect control signal from a handheld remote control; a screen configured to display a control interface thereon; a processor-readable storage medium, comprising a set of instructions for sharing documents on a TV; and a processor in communication with the storage medium. When executing the set of instructions the processor is directed to display a current TV program on the screen under a first operation state of a plurality operation state associated with the current TV program; when receiving a first controlling signal, display a target menu on the screen, wherein the target menu includes a target menu option of operation which is a default option and is associated with the plurality of operation states of the current TV program; and when receiving a second controlling signal, directly switch the TV device to a second operation state along a sequence of the plurality of operation states.

According to another aspect of the present disclosure, a method for operating a TV device may comprise: displaying, by a TV device on a screen thereof, a current TV program under a first operation state of a plurality operation state associated with the current TV program; when receiving a first controlling signal, displaying, by the TV device, a target menu on the screen, wherein the target menu includes a target menu option of operation which is a default option and is associated with the plurality of operation states of the current TV program; and when receiving a second controlling signal, directly switching, by the TV device, the TV device to a second operation state along a sequence of the plurality of operation states.

BRIEF DESCRIPTION OF THE DRAWINGS

The above and other features and advantages will become more apparent by describing in detail example embodiments thereof with reference to the attached drawings in which.

DETAILED DESCRIPTION

As stated above, traditional technologies are facing difficulties that, absent of a specially designed remote controller (with a special button), a user may need to navigate through a number of levels of menus in order to adjust an TV operation state, such as the accompanying sound of the current TV program. The present disclosure provides a solution to the traditional difficulties and improved the accompanying sound selection technology. The present disclosure ensures that a user is able to use a general remote controller to adjust the operation status (e.g., the accompanying sound) within 2 operations. The first operation is to open the quick menu, and the second is to select the default options in the quick menu. For example, when the default options is the accompanying sound of the current TV program, the accompanying sounds are switched along a predetermined sequential of a plurality of options. Thus the user does not have to read each option of the accompanying sound and select the desired one. All the user needs to do is keep pressing the MENU button then followed by OK button to switch the accompanying sound until the desired sound track.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. The following detailed description is, therefore, not intended to be limiting on the scope of what is claimed.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure provides a technology that allows a TV user to use a general remote controller to quickly and easily access an accompanying sound function of the TV, and then easily switch the TV between a few accompanying sound options with a running TV program.

Figure 1:
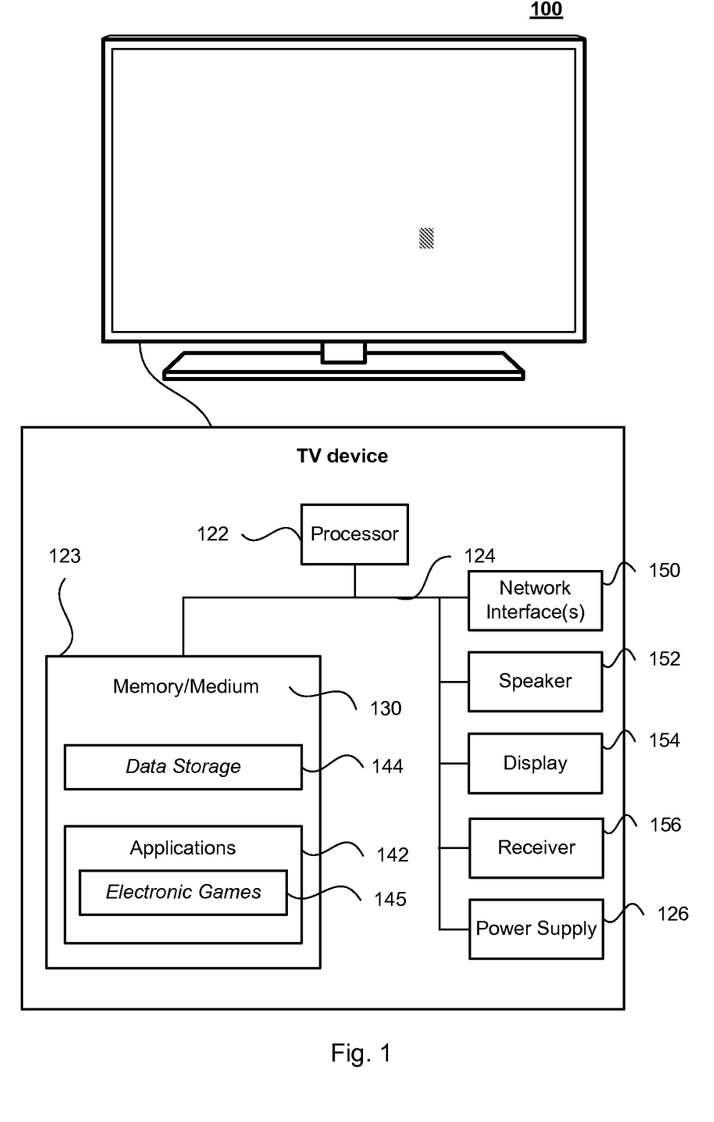
FIG. 1 is a schematic diagram illustrating an example embodiment of a TV device.

FIG. 1 is a schematic diagram illustrating an example embodiment of a TV device 100 that may be used to implement methods introduced in the present disclosure.

The TV device 100 may be an electronic device, such as a set-top box, configured to connect to a TV to expand functions of the TV. For example, the TV device 100 may include a non-transitory and/or transitory storage medium, such as a memory 130 to store data. The memory 130 may store a variety of possible applications 142, such as a video playing application and/or an electronic game 145. The memory 130 may also be configured to conduct data storage, such as audio-visual data received from the network interface 150. The applications 142 and data 144 may be stored as sets of instructions.

Further, the TV device 100 may include a processor 122 in communication with the processor-readable storage media 130. The processor 122 may execute the sets of instructions and perform the methods and/or operations in example embodiments of the present disclosure. The TV device 100 may also include a power supply 126 for providing electrical power.

The TV device 100 may also be a big screen electronic device, such as a TV, or part of the big screen electronic device designed for playing visual audio media, such as videos, sound tracks, photographs, or other types of multimedia applications and/or documents such as electronic games.

As a TV, the TV device 100 may include a display 154, such as a liquid crystal display (LCD), or a display with a high degree of functionality, such as a touch-sensitive color 2D or 3D display. The display may have a size larger than an ordinary person may feel easy to carry. For example, the display may be bigger than an ordinary computer display. For example, the display may be of a rectangular shape 36 inches between two diagonal corners or bigger. When playing an audio-visual media, the TV device 100 may display visual information on the display 154 and audio information through a speaker 152.

The TV device 100 may include a network interface 150. The network interface may be a circuit including an antenna and configured to receive signals from and/or send signals to a satellite TV channel and/or a mobile terminal, and/or a TV service server; the network interface may be a circuit including a cable interface and configured to receive cable TV signals and/or send signals to a server connected to the TV cable; and/or the network interface may be a circuit including a network interface and configured to receive signals from and/or send signals to a network, such as Internet.

Additionally, the TV device 100 may include a receiver 156. The receiver 156 may be an optical receiver configured to receive invisible light controlling signal from a remote controller or an electronic signal receiver to receive an electronic controlling signal from a remote controller. Upon receiving the controlling signal, the receiver may send the controlling signal to the processor 122, which may respond with a corresponding operation over the TV device 100.

Merely for illustration, only one processor will be described in the TV device 100 in the disclosure to execute operations and/or method steps in the following example embodiments. However, it should be note that the electronic device in the present disclosure may also include multiple processors, thus operations and/or method steps that are performed by one processor as described in the present disclosure may also be jointly or separately performed by the multiple processors. For example, if in the present disclosure a processor of an electronic device executes both step A and step B, it should be understood that step A and step B may also be performed by two different processors jointly or separately in the electronic device (e.g., the first processor executes step A and the second processor executes step B, or the first and second processors jointly execute steps A and B).

Figure 2:
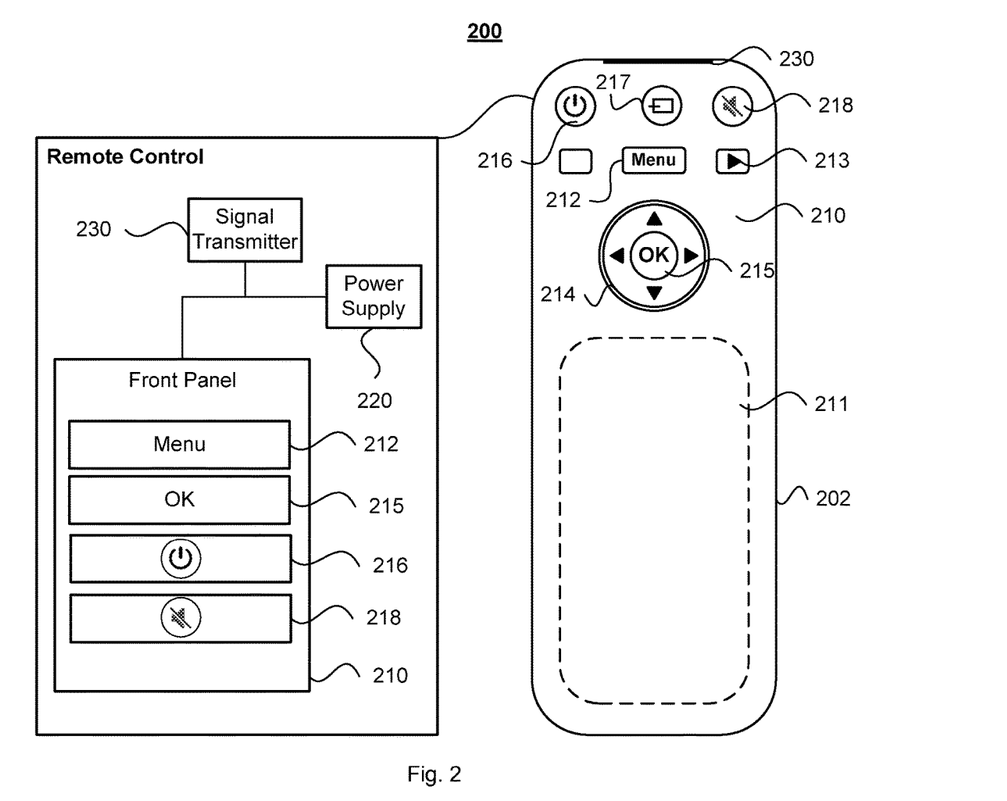
FIG. 2 is a schematic diagram illustrating a handheld remote controller.

FIG. 2 is a schematic diagram illustrating an example embodiment of a handheld remote controller 200 configured to send controlling signals to a TV. The handheld remote controller 200 may be a handheld TV remote controller for general usage, such as a universal TV remote controller, or a general remote controller or a remote controller designed for a particular TV model but does not include a special key designed for selecting accompanying sound.

The remote control 200 may include housing 202. The housing 202 may include a front panel 210, which further include a plurality of buttons. For example, the plurality of buttons may include an (on/off) power button 216; a (volume) mute button 218; and an input source button 217 to select input sources such as Live TV, video on demand, media center, application center, high definition multimedia interface or HDMI, component or COMP, audio/video (NV), digital or analog television (DTV/ATV). The plurality of buttons may also include a play button 213 to play or pause media; a D-pad 214 which includes north, east, west, and south directional arrows to navigate among displayed images and/or move between levels of an application's or object's hierarchy such as application view navigation, panel navigation, and collection navigation; and an OK (or select) button 215 to select a highlighted displayed image, such as displayed speed control, rewind, forward, play, and pause objects and/or objects on a menu bar or in a menu box and/or navigate down a hierarchy of any displayed image or object(s). The plurality of buttons may also include other buttons configured to send out various controlling signals to an associated TV.

The remote control 200 may also include a signal transmitter 230 configure to emit and/or send out a controlling signal. The controlling signal may be a wireless electronic signal or an invisible optical signal. Each of the plurality of button may correspond to a controlling function. When a user presses the button, the remote controller 200 may send out the corresponding signal, which may be received by the receiver 156 of the TV device 100, thereby controlling an operation of the TV device 100.

Figure 3:
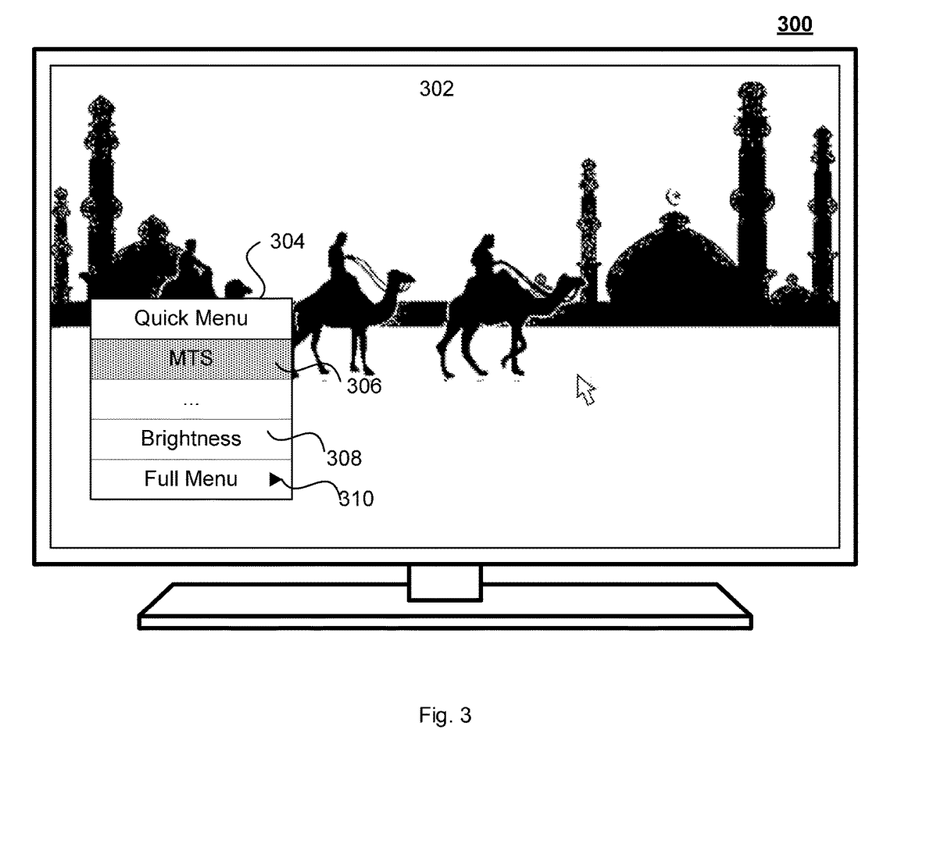
FIG. 3 illustrates a quick menu on a TV for switching and/or selecting an accompanying sound of a current TV program.

FIG. 3 illustrates a quick menu on a TV 300 for switching and/or selecting an accompanying sound of a current TV program. The TV 300 may be the TV 100 or a TV connected to a set-top box 100. At the time of the accompanying sound selection, the TV 300 may be displaying a TV program on its screen 302. The TV program may be a digital program, or may be an analog program.

According to exemplary embodiments of the present disclosure, when a user is watching a target TV program on a TV, he/she may wish to change from the current sound setting of the target TV program to another accompanying sound. For example, when the target TV program is an analog program, i.e., TV signal of the current TV channel is analog, the target TV program may include a plurality of accompanying sound settings (e.g., sound tracks), including for example monophonic sound, stereo sound, and SAP. The default sound for the target TV program may be monophonic and the default language used in the TV program may be English. When the target TV program is a digital program, i.e., TV signals of the current TV channel is digital, the plurality of accompanying sound settings of the target TV program may include various of language settings, such as English, Spanish, English 5.1 etc.

If the user wishes to change the sound of the target TV program to stereo sound, or if the user speaks Spanish and wish to watch the TV program in Spanish, he/she may press a first button on a handheld remote controller. The remote controller may be the remote controller 200. The first button may be a default button, such as the menu button, or may be preselected by the user, wherein preselection of the first button may be achieved via a procedure to program the TV. Accordingly, the remote controller 200 may send out and/or emit a first controlling signal corresponding to the first button through the signal transmitter 230.

The TV 300 may receive the first controlling signal via its receiver. The receiver may transmit a controlling instruction corresponding to the controlling signal to the processor, which may correspondingly execute an instruction saved in a storage medium of the TV 300, and display a corresponding target menu or interface on the screen 302. For example, the target menu may be a quick menu 304.

The target menu 304 may include a plurality of options 306, 308, 310. Each option of the plurality of options 306, 308, 310 may correspond with a function and/or operation state of the TV 300. For example, option 306 may be an accompanying sound option. In FIG. 3, the current TV program is a digital program. Therefore the corresponding accompanying sound option 306 may be a MTS option, including a plurality of language options and/or operation states related to language, such as English, Spanish, and English 5.1 etc. Alternatively, if the current TV program displayed on the screen 302 is an analog signal program, the accompanying sound option 306 may be displayed as SAP, which may include a plurality of sound options and/or operation states such as mono, stereo, and SAP. Thus by selecting the MTS option, a user may be able to select an accompanying sound for the current TV program. Similarly, in FIG. 3, the Brightness option 308 may correspond to a brightness adjustment function of the TV 300, and the Full Menu option 310 may correspond to a list of complete options available for the user as a first level of function selection.

Among the plurality of options 306, 308, 310, one option may be highlighted each time to indicate that this is the option the user is about to select. The user may press the north, east, west, and south directional arrows on the D-pad 214 of the handheld remote controller 200 to send navigating signals to the TV 300. The TV 300 may receive the navigating signal and sequentially move the highlight to a corresponding option appear in the quick menu 304. The user may confirm a selection by pressing a second button on the front panel 210. The second button by default may be the OK button. Alternatively, the second button may be preselected by the user via programming the remote controller 200 and the TV 300. The second button may be a different button from the first button but may also be the same button as the first button for easier user operation.

Among the plurality of options 306, 308, 310, one option may be preset as a default option and highlighted automatically by default, so that when the user presses the second button without navigating along the plurality of options 306, 308, 310, the TV may automatically operate the function corresponds to the default option. For example, in a system that intends to facilitate the accompanying sounding selection, the accompanying sound (MTS/SAP) option may be set as the default option and highlighted when the quick menu is first displayed on the screen 302.

The default option may be a fixed menu option. For example, to facilitate visually handicapped people to select the accompanying sound easily, the accompanying sound option MTS in FIG. 3 may always be a default option. Alternatively, the default option (and/or the plurality of menu options) may be dynamically selected to ensure that it (and/or they) is always among the most frequently used option for the TV during a period of time. For example, if during a week the user of the TV device adjust the brightness of the screen so many times that the Brightness option in FIG. 3 becomes the most frequently used option, the TV device may dynamically select the Brightness option as the default menu option.

When the user selects a target option and clicks the second button (e.g., the OK button) to confirm the selection, the remote controller 200 may emit and/or send out a second controlling signal corresponding to the second button. The TV 300 may receive the second controlling signal and in response operate the operation corresponding to the selected option. To this end, the TV 300 may close the quick menu and switch the operation state directly to one of the plurality of operation state corresponding to the target option. For example, when the user press the OK button to confirm selection of the default accompanying sound option 306 (MTS or SAP), the TV 300 may close the quick menu 304 displayed on the screen 302 and directly turn the sounding of the current TV program to one of the English, Spanish, or English 5.1 etc. when the current TV program is digital; when the current TV program is analog, the TV 300 may directly turn the sounding of the current TV program to one of the mono, stereo, or SAP sound carried together with the signal of the current TV program.

Figure 4A:
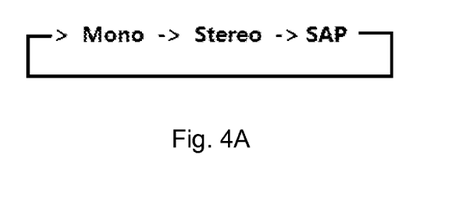
FIG. 4A is an example a sequence that the TV switch between a plurality of audio channels of an Analog TV program.
Figure 4B:
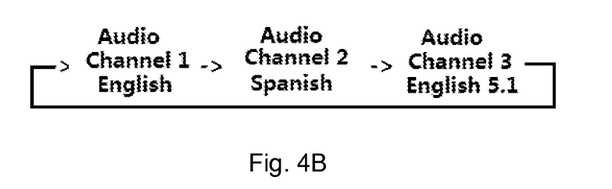
FIG. 4B is an example a sequence that the TV switch between a plurality of accompanying sounds carried by a digital TV program.

Switching between the plurality of operation states may be sequential. For example, as shown in FIG. 4B, a digital TV program currently displayed on screen 302 may carry 3 audio channels: audio channel 1 is in English, audio channel 2 is in Spanish, and audio channel 3 is in English 5.1. Every time the user operates to change the accompanying sound, the TV 300 may switch the accompanying sound along a sequence from the audio channel 1 to audio channel 3, i.e., {English, Spanish, English 5.1, English, Spanish, English 5.1 . . . English, Spanish, English 5.1 . . . }. Similarly, if the TV program is currently in English and the user wishes to turn the accompanying sound to English 5.1, the user may have to change the accompanying sound twice. Similarly, as shown in FIG. 4A, for an analog TV program carrying mono, stereo, and SAP sound signals, the TV 300 may switch the accompanying sound of the TV program along a sequence of {mono, stereo, SAP, mono, stereo, SAP . . . mono, stereo, SAP . . . }.

Figure 5:
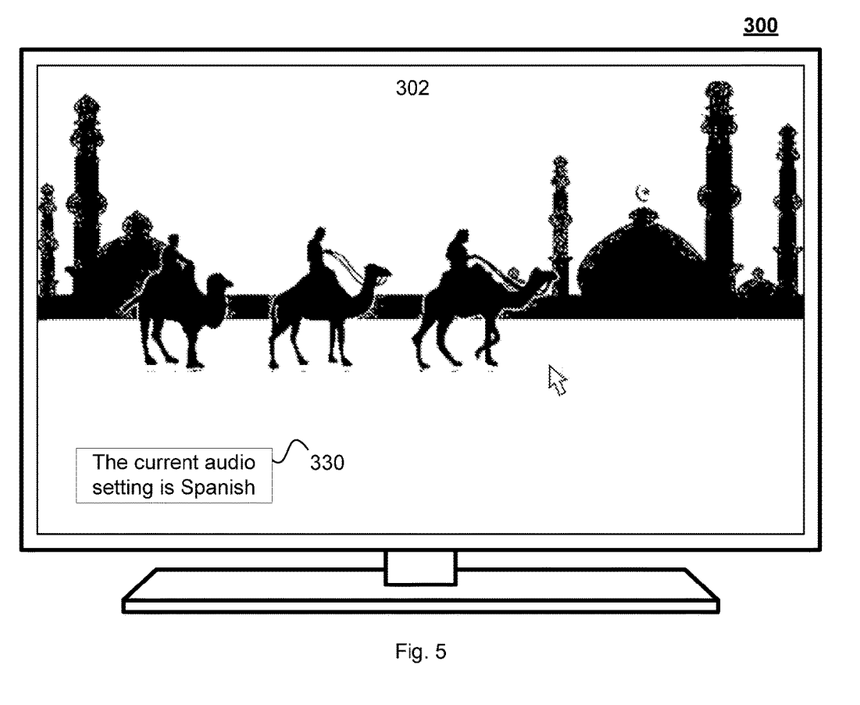
FIG. 5 illustrates an interface showing a current accompanying sound a TV program after the accompanying sound is selected.

After switching from one operation state to another operation state under the selected target option, the TV 300 may display an interface on the screen 302 showing the current operation state of the TV for a first predetermined period of time. For example, as shown in FIG. 5, after the TV 300 switch from the audio channel 1 to audio channel 2, the TV 300 may display a small window 330 on the screen 302 with a text showing that the audio setting of the current TV program is switched to Spanish. The window 330 may be displayed for 3 seconds and then the TV may close the window 330.

Figure 6:
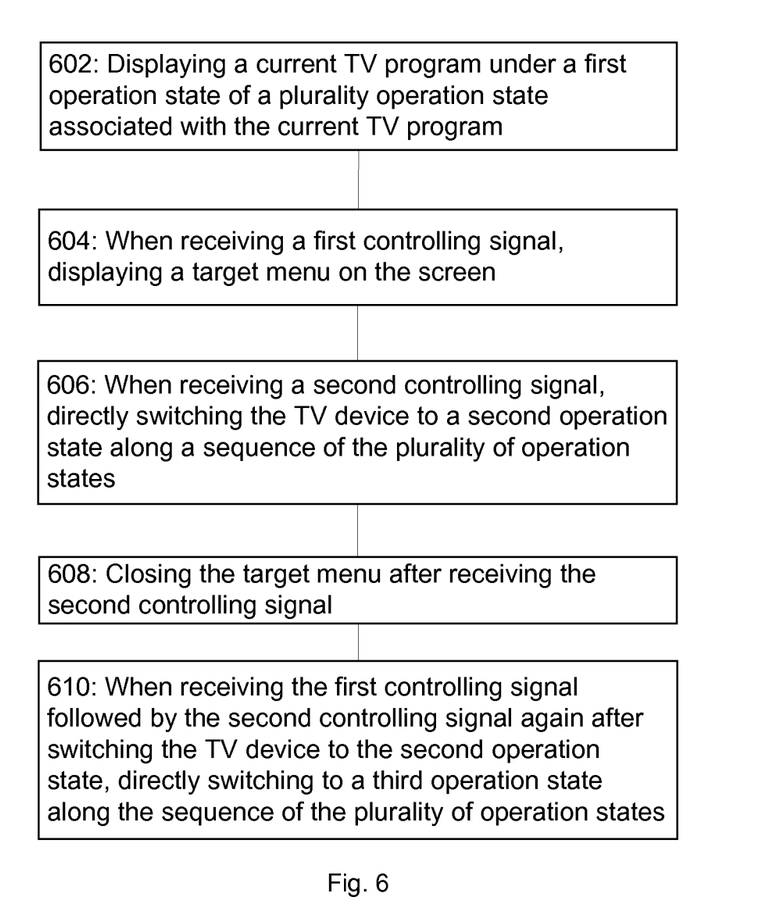
FIG. 6 is a flowchart illustrating a method for switching between different TV program accompanying sounds.

After switching the accompanying sound, if the user wishes to further switch to another audio channel, the user may need to press the first button and start over again. FIG. 6 is a flowchart illustrating a method for switching between different states of operation states of a TV program. The method may be based on functions of the above-introduced TV and remote controller. Further, the method may be implemented in a TV device, such as the TV device 100, as a set of instructions stored in a non-transitory storage medium of the TV device. When executed by a processor of the TV device, the set of instructions may direct the processor to operate the following operations.

602: Displaying a current TV program under a first operation state of a plurality operation state associated with the current TV program.

The TV program may be an analog TV program or a digital TV program, and the plurality of operation states may be a plurality of accompanying sound options carried together with the current TV program. For the digital TV program, the accompanying sound may be a plurality of audio channels, such as language settings of the current TV program; and for the analog TV program, the accompanying sound may include a mono, stereo, and/or SAP sound settings. The first operation state may be one of the plurality of the operation states.

604: When receiving a first controlling signal, displaying a target menu on the screen, wherein the target menu includes a target menu option of operation which is a default option and is associated with the plurality of operation states of the current TV program.

The TV device may be configured to communicate with a remote controller, such as the remote controller 200. The first controlling signal may be a signal sent by the remote controller when a user pressed a first button thereof. The first button may be a Menu button of the remote controller. The first button may also be a button preselected by the user, i.e., the user may select a button on the remote controller and program the remote controller and the TV device to define the button as the first button.

Correspondingly, the first controlling signal may be configured to direct the TV device to display the target menu, which may be a quick menu.

In addition to the target menu option, the target menu may further include a plurality of menu options. Among all the menu options listed on the target menu the target menu option may be a default option in the target menu. For example, the quick menu may include a number of options, wherein an option of the accompanying sound of the current TV program may be the default option.

The default option may be a fixed menu option. For example, to facilitate visually handicapped people to select the accompanying sound easily, the accompanying sound option MTS in FIG. 3 may always be a default option. Alternatively, the default option (and/or the plurality of menu options) may be dynamically selected to ensure that it (and/or they) is always among the most frequently used option for the TV during a period of time. For example, if during a week the user of the TV device adjust the brightness of the screen so many times that the Brightness option in FIG. 3 becomes the most frequently used option, the TV device may dynamically select the Brightness option as the default menu option.

606: When receiving a second controlling signal, directly switching the TV device to a second operation state along a sequence of the plurality of operation states. For example, if the plurality of operation states is in a sequence of mono, stereo, and SAP, the TV device may directly switch its operation state from mono to stereo.

The second controlling signal may be a signal sent by the remote controller when the user presses a second button. The second button may be an OK button of the remote controller. Alternatively, the second button may be a button preselected by the user, i.e., the user may select a button on the remote controller and program the remote controller and the TV device to define the button as the second button. The second button may be selected as a different button from the first button, or may be selected as the same button of the first button.

When the user presses the second button, the remote controller may send out the second controlling signal to the TV device, which may direct the TV to confirm selection of the target menu option.

608: Closing the target menu after receiving the second controlling signal.

610: When receiving the first controlling signal followed by the second controlling signal again after switching the TV device to the second operation state, directly switching to a third operation state along the sequence of the plurality of operation states. For example, when the current TV program is analog, the third operation state may be SAP.

As stated above, traditional technologies are facing a difficulty that absent of a specially designed remote controller (with a special button), a user may need to navigate through a number of levels of menu in order to adjust an TV operation state such as brightness or the accompanying sound of the current TV program. With the above-introduced TV devices and methods, the present disclosure provides a solution to the traditional difficulties. The present disclosure ensures that a user is able to use a general remote controller to adjust the operation status (e.g., the accompanying sound) in 2 levels of operation. The first level is open the quick menu, and the second is to select the default options in the quick menu. Since the default options is the accompanying sound of the current TV program, and the accompanying sounds are switched along a predetermined sequential, the user does not have to read each option of the accompanying sound and select the desired one. All the user needs to do is keep pressing the OK button to switch the accompanying sound until the desired sound track.

While example embodiments of the present disclosure relate to devices and methods for selecting an accompanying sound of a current TB program, the systems and methods may also be applied to other Applications. For example, the device and method may be applied to any function selection of the TV.

Thus, example embodiments illustrated in FIGS. 1-5 serve only as examples to illustrate several ways of implementation of the present disclosure. They should not be construed as to limit the spirit and scope of the example embodiments of the present disclosure. It should be noted that those skilled in the art may still make various modifications or variations without departing from the spirit and scope of the example embodiments. Such modifications and variations shall fall within the protection scope of the example embodiments, as defined in attached claims.

The invention claimed is:

1. A TV device, comprising:
   a sensor configured to detect control signal from a handheld remote control;
   a screen configured to display a control interface thereon;
   a processor-readable storage medium, comprising a set of instructions; and
   a processor in communication with the storage medium, wherein when executing the set of instructions the processor is directed to:
      display a current TV program on the screen under a first operation state of a plurality operation states associated with the current TV program;
      when receiving a first controlling signal from the handheld remote control, display a target menu on the screen, wherein the target menu includes a target menu option of operation which is a default option and is associated with the plurality of operation states of the current TV program; and
      when receiving a next second controlling signal following the first controlling signal from the handheld remote control, directly switch the TV device to a second operation state next to the first operation state along a sequence of the plurality of operation states with a predefined order.

2. The TV device of claim 1, wherein the current TV program is an analog TV program or a digital TV program, and the plurality of operation states comprises a plurality of accompanying sound options carried together with the current TV program.

3. The TV device of claim 1, wherein the first controlling signal corresponds with a first button of the remote controller; and
   the second controlling signal corresponds with a second button of the remote controller.

4. The TV device of claim 3, wherein the first button is a menu button of the remote controller;
   the first controlling signal is configured to direct the TV device to display a quick menu; and
   the target menu is the quick menu.

5. The TV device of claim 3, wherein the second button is an OK button of the remote controller; and
   the second controlling signal is configured to confirm selection of the target menu option.

6. The TV device of claim 3, wherein the first button and the second button is a same button of the remote controller.

7. The TV device of claim 1, wherein the target menu further includes a plurality of menu options; and
   the target menu option is a default option in the target menu.

8. The TV device of claim 1, wherein the target menu option is associated with a function of the TV device that is most frequently used within a predetermined period of time.

9. The TV device of claim 1, wherein the processor is further directed to:
   when receiving the first controlling signal followed by the second controlling signal again after switching the TV device to the second operation state, directly switch to a third operation state along the sequence of the plurality of operation states.

10. The TV device of claim 9, wherein the processor is further directed to:
    close the target menu after receiving the second controlling signal.

11. A method for operating a TV device, comprising:
    displaying, by a TV device on a screen thereof, a current TV program under a first operation state of a plurality operation states associated with the current TV program;
    when receiving a first controlling signal, displaying, by the TV device, a target menu on the screen, wherein the target menu includes a target menu option of operation which is a default option and is associated with the plurality of operation states of the current TV program; and
    when receiving a next second controlling signal following the first controlling signal, directly switching, by the TV device, the TV device to a second operation state next to the first operation state along a sequence of the plurality of operation states with a predefined order.

12. The method of claim 11, wherein the current TV program is an analog TV program or a digital TV program, and the plurality of operation states comprises a plurality of accompanying sound options carried together with the current TV program.

13. The method of claim 11, wherein the TV device is configured to communicate with a remote controller;
    the first controlling signal corresponds with a first button of the remote controller; and
    the second controlling signal corresponds with a second button of the remote controller.

14. The method of claim 13, wherein the first button is a menu button of the remote controller;
    the first controlling signal is configured to direct the TV device to display a quick menu; and
    the target menu is the quick menu.

15. The method of claim 13, wherein the second button is an OK button of the remote controller; and
    the second controlling signal is configured to confirm selection of the target menu option.

16. The method of claim 13, wherein the first button and the second button is a same button of the remote controller.

17. The method of claim 11, wherein the target menu further includes a plurality of menu options; and
   the target menu option is a default option in the target menu.

18. The method of claim 11, wherein the target menu option is associated with a function of the TV device that is most frequently used within a predetermined period of time.

19. The method of claim 11, further comprising:
   when receiving the first controlling signal followed by the second controlling signal again after switching the TV device to the second operation state, directly switching, by the TV device, the TV device to a third operation state along the sequence of the plurality of operation states.

20. The method of claim 19, further comprising:
   closing, by the TV device, the target menu after receiving the second controlling signal.

\* \* \* \* \*